US011546358B1

(12) United States Patent
Robinson et al.

(10) Patent No.: US 11,546,358 B1
(45) Date of Patent: Jan. 3, 2023

(54) AUTHORIZATION TOKEN CONFIDENCE SYSTEM

(71) Applicant: Netskope, Inc., Santa Clara, CA (US)

(72) Inventors: James S. Robinson, Indianapolis, IN (US); Damian C. Chung, Gilbert, AZ (US); Lamont Orange, Florrisant, MO (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/492,523

(22) Filed: Oct. 1, 2021

(51) Int. Cl.
*H04L 9/40* (2022.01)

(52) U.S. Cl.
CPC ...... *H04L 63/1416* (2013.01); *H04L 63/0807* (2013.01); *H04L 63/0876* (2013.01); *H04L 63/1433* (2013.01); *H04L 63/168* (2013.01)

(58) Field of Classification Search
CPC ............. H04L 63/1416; H04L 63/0807; H04L 63/0876; H04L 63/1433; H04L 63/168; H04L 63/08; H04L 9/3213
USPC ......................................................... 726/22
See application file for complete search history.

(56) References Cited

U.S. PATENT DOCUMENTS

| 8,077,832 | B2 | 12/2011 | Othmer et al. |
| 8,346,229 | B2 | 1/2013 | Scott |
| 8,352,303 | B2 | 1/2013 | Lehmann et al. |
| 8,402,525 | B1* | 3/2013 | Shah ................... H04L 41/0273 726/28 |
| 8,600,794 | B2 | 12/2013 | Blair et al. |
| 8,732,800 | B1 | 5/2014 | Askew |
| 8,893,140 | B2 | 11/2014 | Meyer |
| 8,942,683 | B2 | 1/2015 | Doeer et al. |
| 9,043,861 | B2 | 5/2015 | Lang et al. |
| 9,418,213 | B1* | 8/2016 | Roth ..................... G06F 21/335 |
| 9,432,372 | B2 | 8/2016 | Anantharaman et al. |
| 9,690,925 | B1* | 6/2017 | Banerjee ................. G06F 21/88 |
| 9,866,594 | B2 | 1/2018 | Lim |
| 9,998,496 | B2 | 6/2018 | Narayanaswamy et al. |
| 10,333,979 | B1* | 6/2019 | Stickle ................ H04L 63/0807 |
| 10,567,381 | B1* | 2/2020 | Baer ..................... H04L 63/068 |
| 11,019,101 | B2 | 5/2021 | Narayanaswamy et al. |

(Continued)

FOREIGN PATENT DOCUMENTS

CN 104516777 B 5/2019
JP 6609086 B1 1/2020

*Primary Examiner* — Dant B Shaifer Harriman
*Assistant Examiner* — Mahabub S Ahmed
(74) *Attorney, Agent, or Firm* — Kilpatrick Townsend & Stockton, LLP

(57) ABSTRACT

A policy-controlled authorization system for managing tokens used to access services in a cloud based multi-tenant system. The policy-controlled authorization system includes a local application that executes on a client device, a policy component including a plurality of policies, and a mid-link server, coupled to the client device. A request for access to a service on a remote application running on a remote instance of a web server is provided by the local application. A token is required to access the service. A correlator correlates the token with the plurality of tokens for identifying a policy from the plurality of policies associated with the token. A token inspector authorizes the token for accessing the service based on the correlation. Based on the authorization, either the token is authorized for access to the service via the remote application, or the token is blocked when unauthorized to prevent access to the service.

20 Claims, 8 Drawing Sheets

(56) References Cited

U.S. PATENT DOCUMENTS

| | | | |
|---|---|---|---|
| 11,151,660 B1* | 10/2021 | Harding | G06F 7/14 |
| 11,316,693 B2* | 4/2022 | Telfer | H04L 67/12 |
| 2004/0117170 A1* | 6/2004 | Walsh | H04L 63/0807 |
| | | | 703/13 |
| 2004/0117460 A1* | 6/2004 | Walsh | H04L 41/145 |
| | | | 709/204 |
| 2004/0193457 A1* | 9/2004 | Shogren | G06Q 10/02 |
| | | | 705/5 |
| 2006/0080352 A1* | 4/2006 | Boubez | H04L 63/166 |
| | | | 707/999.102 |
| 2007/0245414 A1* | 10/2007 | Chan | H04L 9/3234 |
| | | | 726/12 |
| 2011/0022642 A1* | 1/2011 | deMilo | G06F 16/122 |
| | | | 707/805 |
| 2011/0179477 A1* | 7/2011 | Starnes | H04L 63/12 |
| | | | 726/9 |
| 2011/0265168 A1* | 10/2011 | Lucovsky | H04L 63/10 |
| | | | 709/223 |
| 2011/0307947 A1* | 12/2011 | Kariv | H04L 63/08 |
| | | | 726/9 |
| 2013/0097656 A1* | 4/2013 | Kennedy | H04L 63/0209 |
| | | | 726/1 |
| 2013/0263212 A1* | 10/2013 | Faltyn | H04L 63/20 |
| | | | 726/1 |
| 2014/0025585 A1* | 1/2014 | Caiman | G06Q 20/405 |
| | | | 705/76 |
| 2014/0044123 A1* | 2/2014 | Lawson | H04L 63/0807 |
| | | | 370/352 |
| 2014/0053280 A1* | 2/2014 | Durazzo | H04L 63/10 |
| | | | 726/28 |
| 2014/0059226 A1* | 2/2014 | Messerli | H04L 12/4641 |
| | | | 709/226 |
| 2014/0108474 A1* | 4/2014 | David | H04L 67/568 |
| | | | 707/827 |
| 2014/0274086 A1* | 9/2014 | Boerjesson | H04L 65/1069 |
| | | | 455/450 |
| 2014/0351425 A1* | 11/2014 | Madani | H04L 43/08 |
| | | | 709/224 |
| 2014/0366080 A1* | 12/2014 | Gupta | H04W 12/35 |
| | | | 726/1 |
| 2015/0020177 A1* | 1/2015 | Shmulevich | H04L 63/083 |
| | | | 715/239 |
| 2015/0089569 A1* | 3/2015 | Sondhi | H04L 63/10 |
| | | | 726/4 |
| 2015/0100495 A1* | 4/2015 | Salama | G06Q 20/38215 |
| | | | 705/65 |
| 2015/0135302 A1* | 5/2015 | Cohen | G06F 8/51 |
| | | | 726/12 |
| 2015/0150110 A1* | 5/2015 | Canning | H04L 63/0807 |
| | | | 726/9 |
| 2015/0371031 A1* | 12/2015 | Ueno | G06F 21/335 |
| | | | 726/21 |
| 2016/0028737 A1* | 1/2016 | Srinivasan | H04L 63/0807 |
| | | | 726/4 |
| 2016/0036855 A1* | 2/2016 | Gan | H04L 67/562 |
| | | | 726/1 |
| 2016/0042192 A1 | 2/2016 | Motoyama | |
| 2016/0088023 A1* | 3/2016 | Handa | H04L 67/02 |
| | | | 709/219 |
| 2016/0182487 A1* | 6/2016 | Zhu | H04L 63/104 |
| | | | 726/9 |
| 2016/0248682 A1* | 8/2016 | Lee | H04L 67/146 |
| 2016/0255050 A1* | 9/2016 | Grayson | H04L 63/1433 |
| | | | 726/1 |
| 2016/0344736 A1* | 11/2016 | Khait | H04L 63/102 |
| 2017/0004182 A1* | 1/2017 | Simpson | H04L 51/52 |
| 2017/0006036 A1* | 1/2017 | Bellingham | G06F 16/951 |
| 2017/0070504 A1* | 3/2017 | Ramachandran | H04L 63/061 |
| 2017/0142068 A1* | 5/2017 | Devarajan | H04L 67/146 |
| 2017/0155655 A1* | 6/2017 | Spaulding | H04L 9/3226 |
| 2017/0169433 A1* | 6/2017 | De Magalhaes | H04L 63/123 |
| 2017/0272472 A1* | 9/2017 | Adhar | G06F 21/602 |
| 2017/0331829 A1* | 11/2017 | Lander | G06F 21/6218 |
| 2018/0027006 A1* | 1/2018 | Zimmermann | G06F 21/6218 |
| | | | 726/11 |
| 2018/0041487 A1* | 2/2018 | Wang | H04L 63/0807 |
| 2018/0115551 A1* | 4/2018 | Cole | H04L 63/083 |
| 2018/0139192 A1* | 5/2018 | Pishinov | H04L 63/0815 |
| 2018/0234464 A1* | 8/2018 | Sim | H04L 9/3213 |
| 2019/0121989 A1* | 4/2019 | Mousseau | H04L 63/0861 |
| 2019/0207929 A1* | 7/2019 | Koorapati | G06F 3/0652 |
| 2019/0273746 A1* | 9/2019 | Coffing | G06Q 20/40 |
| 2020/0045065 A1* | 2/2020 | Sanap | H04L 63/1483 |
| 2020/0153827 A1* | 5/2020 | Moen | H04L 63/1441 |
| 2020/0169549 A1* | 5/2020 | Smith | H04L 67/141 |
| 2020/0177548 A1* | 6/2020 | Devarajan | H04L 67/141 |
| 2020/0204371 A1* | 6/2020 | Chengalvala | H04L 63/105 |
| 2020/0205002 A1* | 6/2020 | Talwar | H04L 9/3213 |
| 2020/0213114 A1* | 7/2020 | Sarin | H04M 3/493 |
| 2020/0226596 A1* | 7/2020 | Takeuchi | G06Q 20/367 |
| 2020/0396065 A1* | 12/2020 | Gutierrez-Sheris | H04L 9/3239 |
| 2021/0019383 A1* | 1/2021 | Huang | G06F 21/57 |
| 2021/0021608 A1* | 1/2021 | Fynaardt | H04W 12/35 |
| 2021/0084031 A1* | 3/2021 | Lao | H04L 12/462 |
| 2021/0099297 A1* | 4/2021 | Mane | H04L 9/3213 |
| 2021/0099450 A1* | 4/2021 | Jain | H04L 63/10 |
| 2021/0135983 A1* | 5/2021 | Farnham | H04L 45/70 |
| 2021/0136095 A1* | 5/2021 | Dinh | H04L 63/1458 |
| 2021/0150411 A1* | 5/2021 | Coenders | G06K 9/6262 |
| 2021/0160219 A1 | 5/2021 | Golds chlag et al. | |
| 2021/0168147 A1* | 6/2021 | Gupta | H04L 63/08 |
| 2021/0288970 A1* | 9/2021 | Chawla | H04L 63/102 |
| 2021/0314339 A1* | 10/2021 | Tsarfati | G06F 21/577 |
| 2021/0383377 A1* | 12/2021 | Zhou | G06Q 20/38215 |
| 2021/0409219 A1* | 12/2021 | Elmenshawy | H04L 9/3073 |
| 2022/0012347 A1* | 1/2022 | Mousseau | H04L 67/12 |

* cited by examiner

AUTHORIZATION TOKEN CONFIDENCE SYSTEM

BACKGROUND

This disclosure relates in general to token-based authorization systems and, but not by way of limitation, to policy-controlled authorization and management of tokens for secure access to services among other things.

Tokens are used by local applications on a user device to access services using remote applications of the services. For example, user application connects to another application, or an application connects to other application. Tokens are also used for cloud to cloud interactions and enterprises can identify the tokens either as brokers or by connecting into the cloud application managed by Information Technology (IT) professionals of the enterprise which provide the access. Monitoring the tokens is problematic especially when an organization desires to control the local applications that may access their cloud systems. The cloud systems being open accepts the tokens with an authorization from a user and therefore lacks an administrator control. The tokens may be malicious or unauthorized by the organization. Additionally, some tokens may be unidentifiable thereby causing difficulty in tracing the service associated with them. Moreover, usage of these tokens may pose a security threat for the organization leading to credibility and financial loss.

Tracking and inspection of the tokens is performed by an Information Technology (IT) staff of the organization. The malicious, compromised, nefarious, anonymous, and the unauthorized tokens are revoked by the IT staff after being authorized by the user. However, manual inspection of the tokens is time-consuming and is an inefficient way to address the malicious and the unauthorized tokens.

SUMMARY

In one embodiment, the present disclosure provides a policy-controlled authorization system for managing tokens used to access services in a cloud based multi-tenant system. The policy-controlled authorization system includes a local application that executes on a client device, a policy component including a plurality of policies, and a mid-link server, coupled to the client device. A request for access to a service on a remote application running on a remote instance of a web server is provided by the local application. A token is required to access the service. A correlator correlates the token with the plurality of tokens for identifying a policy from the plurality of policies associated with the token. A token inspector authorizes the token for accessing the service based on the correlation. Based on the authorization, either the token is authorized for access to the service via the remote application, or the token is blocked when unauthorized to prevent access to the service.

In an embodiment, a policy-controlled authorization system is disclosed. The policy-controlled authorization system is for managing tokens used to access services in a cloud based multi-tenant system. The policy-controlled authorization system includes a client device having a local application configured to execute on a client device, a policy component, and a mid-link server. The local application is further configured to provide a request for access to a service on a remote application running on a remote instance of a web server. A token is required to access the service. The policy component including a plurality of policies. The plurality of policies specify access to a plurality of remote applications to be used at the client device for accessing a plurality of services using a plurality of tokens. The mid-link server, coupled to the client device, the mid-link server includes a router configured to provision the plurality of policies for the service to the web server, a correlator configured to correlate the token with the plurality of tokens in the policy component for identifying a policy from the plurality of policies associated with the token. The plurality of tokens is categorized in a token repository based on the plurality of policies. A token inspector of the mid-link server is configured to authorize the token for accessing the service based on the correlation. Based on the authorization, either authorize the token for access to the service via the remote application, or block the token when unauthorized to prevent access to the service.

In another embodiment, a method for policy-controlled management of tokens for providing secure access to services in cloud-based multi-tenant systems. In one step, a request is provided by a local application running on a client device for access to a service on a remote application running on a remote instance of a web server. A token is required to access the service. The token is correlated with a plurality of tokens in a token repository for identifying a policy from a plurality of policies associated with the token. The plurality of policies specify access to a plurality of remote applications to be used at the client device for accessing a plurality of services using the plurality of tokens. The plurality of tokens is categorized in the token repository based on the plurality of policies. An authorization is determined by a mid-link server corresponding to the token for accessing the service based on the correlation. In response to determination of the authorization, either the token is authorized for accessing the service via the remote application, or the token is blocked when unauthorized to prevent access to the service.

In yet another embodiment, a policy-controlled token authorization system for managing secure access to services in cloud-based multi-tenant systems using access tokens, the policy-controlled token authorization system comprising a plurality of servers, collectively having code for:
  requesting by a local application running on a client device access to a service on a remote application running on a remote instance of a web server, wherein a token is required to access the service;
  correlating the token with a plurality of tokens in a token repository for identifying a policy from a plurality of policies associated with the token, wherein: the plurality of policies specify access to a plurality of remote applications to be used at the client device for accessing a plurality of services using the plurality of tokens, and the plurality of tokens is categorized in the token repository based on the plurality of policies;
  determining an authorization by a mid-link server corresponding to the token for accessing the service based on the correlation; and in response to determining the authorization, either:
  authorizing the token for accessing the service via the remote application, or
  blocking the token when unauthorized to prevent access to the service.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
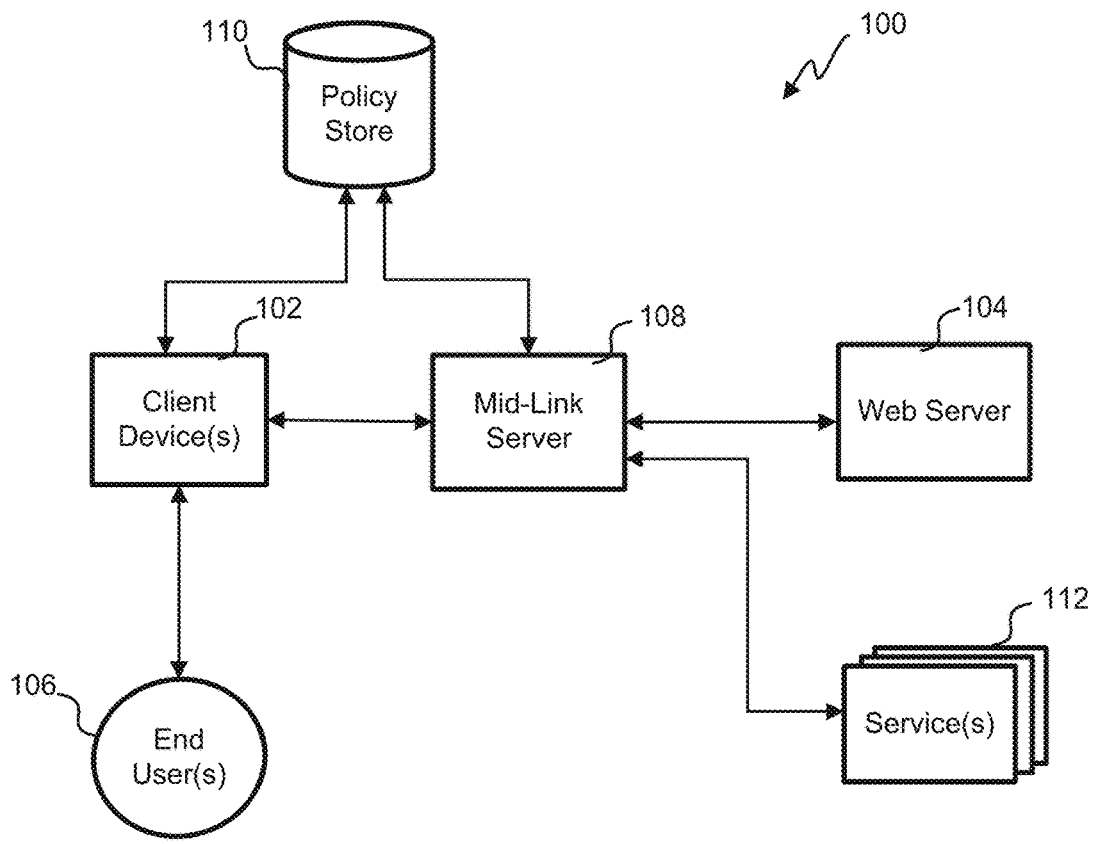
FIG. 1 illustrates a block diagram of an embodiment of a policy-controlled authorization system.

Referring first to FIG. 1, a block diagram of a policy-controlled authorization system 100 is shown. The policy-controlled authorization system 100 includes client device(s) 102, a web server 104, end user(s) 106, a mid-link server 108, a policy store 110, and service(s) 112. The client device 102 include client/server in a cloud application or a system of an enterprise to another cloud application or the system authorization which is approved in a web user interface or application integration of the system. The client device(s) 102 such as smartphones, tablets, PCs, and any other computing devices communicate with the web server 104 via encryption links using the internet. The client device(s) 102 may be secured by using the mid-link server 108 that remotely hosts a secured software environment. The client device(s) 102 run any popular operating system (OS) such as Windows™, iOS™, Android™, Linux, set top box OSes such as Real-Time Operating System (RTOS), Unix OS, Linux-Kernel, and Linux OS in Internet of Things (IoT)/Industrial control systems (ICS)/Distributed Control Systems (DCS)/Operational Technology (OT), and Chromebook™. The operating system of the client device(s) 102 runs third party apps. The policy store 110 (or a policy component) holds policies for each client device 102 and the mid-link server 108.

The client device(s) 102 use content and processing from the web server 104 including content sites for example, web sites, streaming content, etc. and the service(s) 112 for example, SaaS tools, databases, cloud service providers, etc. Under policy control, the client device 102 routes some interaction to the mid-link server 108 that hosts a controlled software environment for each end user 106 to securely interact with the web server 104 and the service(s) 112 or enterprise tools in a way limited by specified policies. For example, policies may specify configuration settings of token protocols that are used for establishing secure connection between local applications on the client device 102 and remote applications of the service(s) 112 on the web server 104 while using the controlled software environment by remote access. The policies for tokens that may be referred as token policies specify a manner in which the tokens are to be used by the local applications.

The token policies control the manner in which the service(s) 112 are accessed at the client device 102. Other token policies may enable certain software applications or interaction on the client device 102 while physically on premise and allowing different software applications or interaction while working in the field or at home away from the enterprise premises. In one example, a token policy on the client device 102, accessing a meeting application using a token on a remote software environment may be disabled for some or all applications when accessed from a mobile of the end user 106. In some cases, enforcement of the token policy depends on whether the client device 102 is within the enterprise or away from the office. Token protocols for example, Open Authorization (OAuth), Federated Identity Management (FIM), OpenID Connect (OIDC), Security Access Markup Language (SAML), Web Services Federation (WS-Fed), and Single Sign On (SSO) provide communication along a network in an encrypted manner. These authentication token protocols are used for establishing secure links between the local applications on the client device(s) 102 and the content sites of the web server 104. An example of the policies is illustrated in Table 1 discussed below.

Table 1 below illustrates a list of policies, a list of applications on the client device 102, and a list of remote applications of the service(s) 112 stored in the policy store 110. Table 2 below illustrates categorization, threat level and confidence score of the tokens.

TABLE 1

| Policies | Remote Application | Token Policy | Authorization |
|---|---|---|---|
| Policy 1 | Contacts API | Tokens allowed | Authorized |
| Policy 2 | Calendar API | OAuth tokens allowed | Authorized |
| Policy 3 | Meeting API | SAML, SSO, and ID tokens allowed | Authorized |
| Policy 4 | Music Streaming API | Tokens allowed | Authorized |
| Policy 5 | Online storage | Tokens not allowed | Unauthorized |
| Policy 6 | Online documents | Tokens allowed | Authorized |
| Policy 7 | Social media accounts | Tokens not allowed | Unauthorized |

TABLE 2

| Tokens  | Subcategory | Threat Level | Confidence Score |
|---------|-------------|--------------|------------------|
| Token 1 | Malicious   | 5            | 45               |
| Token 2 | Bad         | 4            | 30               |
| Token 3 | Nefarious   | 3            | 67               |
| Token 4 | Compromised | 6            | 75               |
| Token 5 | Good        | 10           | 90               |
| Token 6 | Anonymous   | 7            | 65               |
| Token 7 | Trustworthy | 9            | 95               |

As illustrated in Table 1, the token policies are specified with respective remote applications, authorization, and tokens. The tokens are categorized as authorized or unauthorized based on the policy. For example, Policy 1 is associated with an application using the tokens to make requests to a contacts API (a remote application) on behalf of the end user 106. The token policy specified in the policy 1 allows the use of the tokens for accessing the contact API. Similarly, policy 2 allows OAuth tokens to be used by the app to access the calendar API. Policy 3 allows SAML, SSO, and ID tokens for accessing meeting application and policy 4 allows the tokens for accessing a music streaming API. Policy 5 restricts the use of tokens for accessing online storage for example a drive. Policy 6 allows tokens for accessing online documents. Policy 7 restricts use of the tokens for accessing social media accounts.

These policies are set based on a number of factors. The factors include user logs of the client device(s) 102, tenants of the client device(s) 102, confidentiality associated with the service(s) 112 and the remote applications such as being critical or secret, types of the remote applications such as music, social media, official app, types of the client device(s) 102 such as phone, laptop, mobile, and/or a designation of the end user(s) 106 such as President, Manager, Analyst etc. The policies are set by an administrator of the organization of the end user 106 based on the factors. In another embodiment, the policies may be set by the end user 106 of the client device 102. The local applications that have been allowed access of the tokens are authorized for use by the end user 106 and the local applications that have restricted access of the tokens are unauthorized for use as set by their corresponding policies.

As illustrated in Table 2, the tokens are subcategorized as malicious, bad, nefarious, compromised, good, anonymous, trustworthy. The respective threat levels and confidence scores of the tokens are also provided in the table 2. The threat levels are numerical values ranging between 1 and 10 with 1 being the lowest and the 10 being the highest. The confidence scores are also numerical values ranging between 10 and 100 with 100 being the best confidence score and 10 being the least score that require re-authorization. Other methods of defining the threat levels and the confidence scores may also be used such as heat maps, bar graphs, charts, or highlights.

The web server 104 includes the content sites such as web sites, streaming content, or application web sites etc. in order to provide content to the client device(s) 102. The web server 104 also allows the end user(s) 106 of the client device(s) 102 to upload and download content from the content sites. The web server 104 is in communication with the client device(s) 102 via the mid-link server 108 over the internet. In another embodiment, the policy-controlled authorization system 100 includes one or more application servers (not shown) for providing dynamic content to the client device(s) 102.

The mid-link server 108 for the work systems resides as a "man-in-the-middle" intentionally take over some or all: processing, application execution and/or content sites at the web server 104 and the service(s) 112 interaction. The remote software environment is hosted by the mid-link server 108 for a policy-controlled experience using the policy store 110 for authorization. For example, the content sites at the web server 104 may have certain applications disabled, filtered or modified by the mid-link server 108 so that the client device(s) 102 behaves differently than if it were to directly connect to the content sites of the web server 104. For example, a policy may specify connection using a token based on a meeting application allowed by the policy.

Some embodiments have policies that selectively direct tokens to the mid-link server 108 based on a label or tag of the remote application. A classifier may identify the label or the tag of the application. For example, the remote application may be classified as restricted, or public based on a type of the remote application. For example, a meeting application may be restricted, a calendar application may be public and allowed, or a zipped folder may be confidential and restricted. By way of another example, the tokens may be allowed for the calendar application during office hours or at an official system but may be restricted on the mobile or at a remote location from the office. Similarly, the tokens may be restricted for the meeting application based on their respective policies. The tokens may not be allowed for accessing a confidential document from an unauthorized application.

The policy store 110 is a database that includes predefined policies for authorizing the tokens to access the service(s) 112. The policy store 110 also includes the remote applications and the local applications associated with the policies. The remote applications include third party applications such as social media, emails, calendar, meeting or streaming applications. The local applications are used to access the remote applications using the tokens. For example, a policy associated with a calendar application specifies use of authorized access tokens. The policies may be predefined by the enterprise or the client device 102. Modified policies are also stored in the policy store 110 by the administrator or the enterprise.

In an embodiment, the policy-controlled authorization system 100 allows multiple-tenants in different domains to communicate with the web server 104 over the internet. The policy-controlled authorization system 100 allows multiple tenants or enterprises (not shown) to all use the same network separated by domain or some other logical separation. The policy-controlled authorization system 100 manages tokens used to access services in cloud based multi-tenant system (s) (not shown). Encryption, leased/encrypted tunnels, firewalls, and/or gateways can be used to keep the data from one enterprise separate from other enterprises. Each client device 102 can communicate with the web server 104 for the service(s) 112 and storage using the internet. The mid-link server 108 provides multi-tenancy control, policies and routing for each domain.

Figure 2:
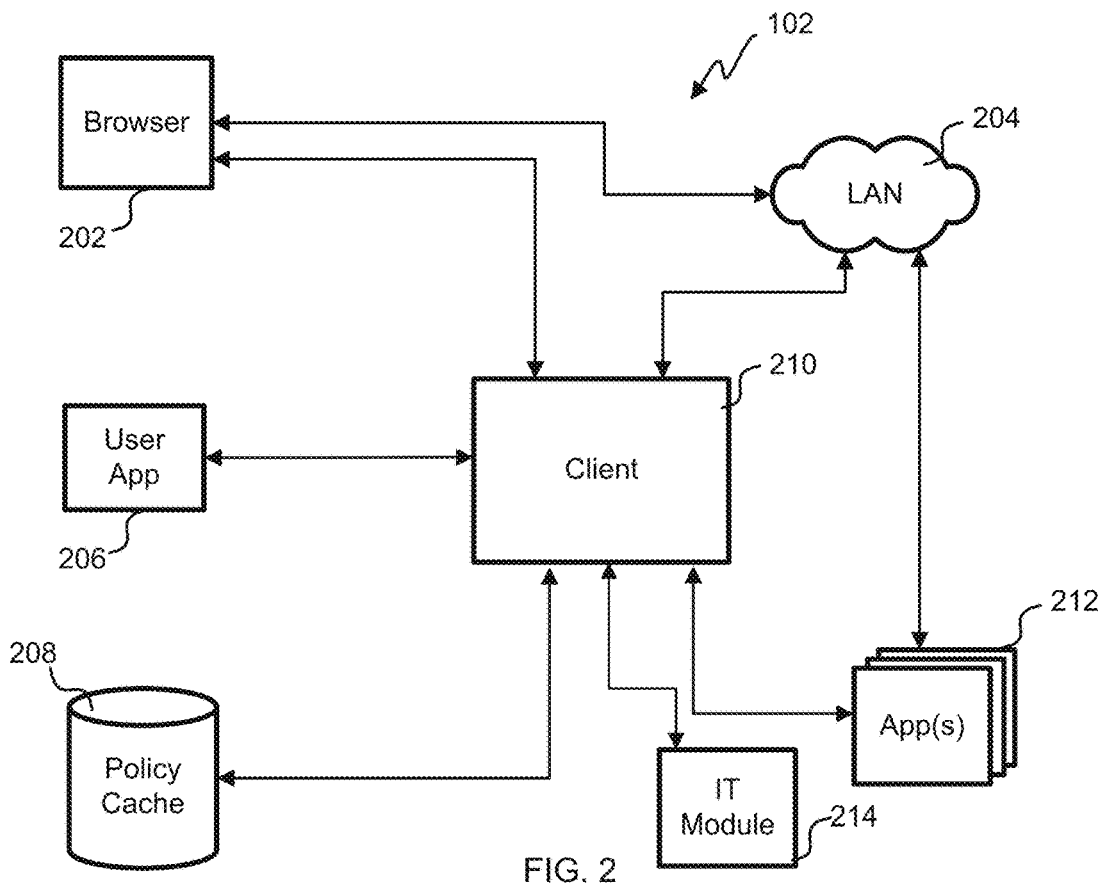
FIG. 2 illustrates a block diagram of a client device that uses a client to establish connections with a mid-link server.

Referring specifically to FIG. 2, a block diagram of the client device 102 is shown. This embodiment of the client device 102 uses a client 210 to establish connections with the mid-link server 108. A user app 206 exclusively uses the client 210 to communicate with the mid-link server 108 to maintain security for operation of the user app 206.

Display of the remote software environment is performed by the user app 206. In an embodiment, the user app 206 may be a local application. The entire interface of the remote software environment could be displayed or the interface of a single user app could be displayed. Several instances of the user app 206 could display several user app interfaces respectively. Multiple instances of the user app 206 could have several remote software environments respectively running. The user app 206 is a web browser or a video player in some embodiments merely displaying a stream of video.

The client 210 can apply policies that are stored locally in a policy cache 208 to the client device 102. The policy cache 208 is populated with the policies from the policy store 110 that are relevant for the respective client device 102. As conditions change, the policies that are in effect could also change. For example, use of tokens associated with the camera/video sensors based applications on the client device 102 could be disabled inside the office or factory, but re-enabled outside of a geofenced area. Certain features, functions or applications might be disabled by a specific policy for the tokens until certain conditions exist. For example, there may be a policy that restricts tokens for accessing meeting apps on the mobile of the end user 106 during offline hours or when using unrecognized Virtual Private Network (VPN). Further, another policy allows use of the tokens for accessing calendar applications from the client device 102. The client 210 supports the user app 206, apps 212 running on the client device 102 or a browser 202 in communication with the mid-link server 108 via a Local Area Network (LAN) 204.

An Information Technology (IT) module 214 provides an interface for an administrator or IT staff of an organization of the end user 106 for analyzing log reports and the tokens and assigning policies to the client device(s) 102. The administrator of the enterprise reviews the policies, the tokens, established connections, and/or local applications and the remote applications. The administrator may also modify the policies by updating and/or upgrading the policies using the IT module 214.

Figure 3:
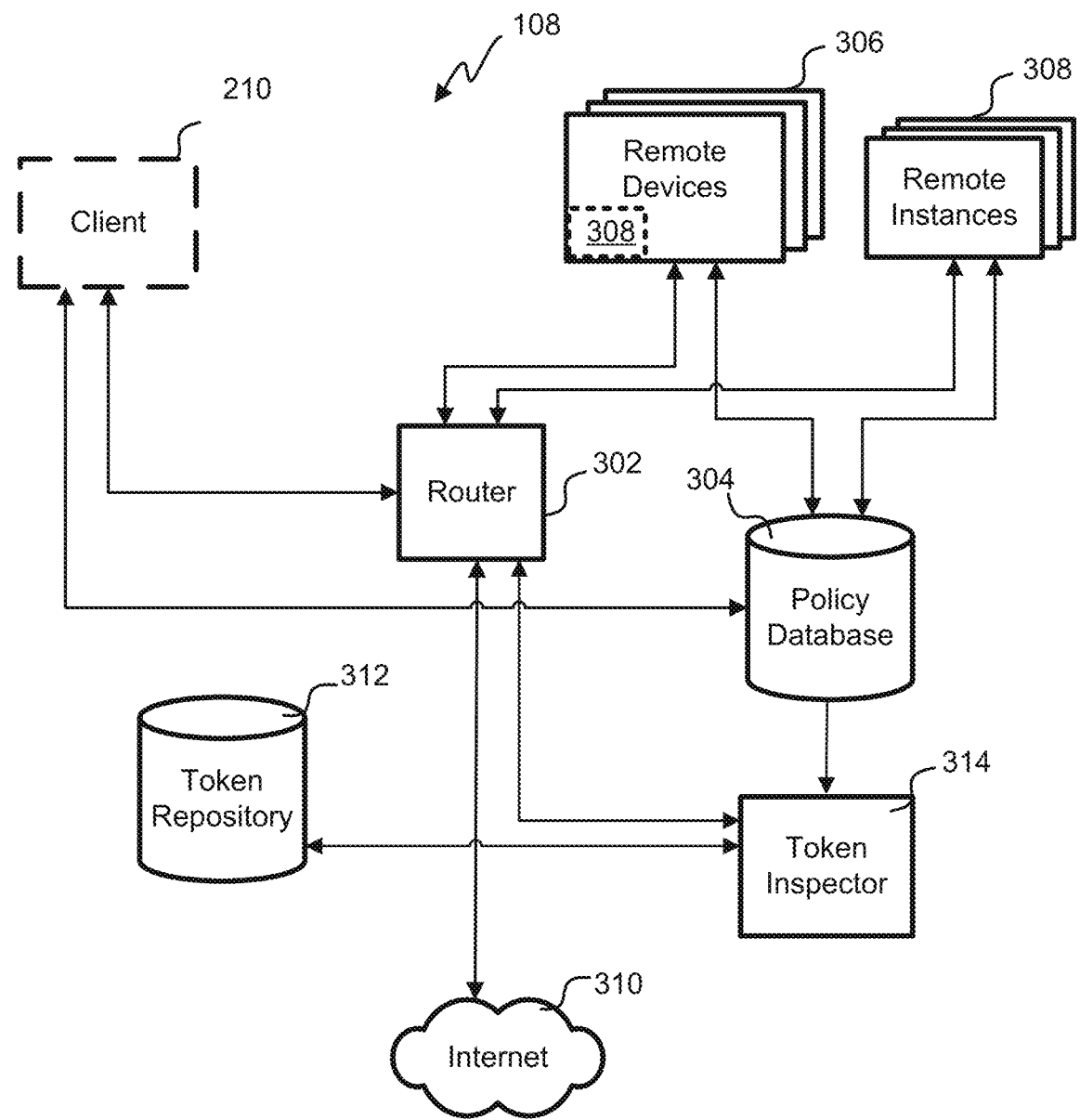
FIG. 3 illustrates a block diagram of a mid-link server that hosts software environments that client device(s) remote into.

Referring next to FIG. 3, a block diagram of the mid-link server 108 is shown that hosts software environments that the client device(s) 102 remote into. Traffic is passed with an Internet 310 accessed through a router 302 to enable the various depicted components of the mid-link server 108 to communicate with each other, specifically, the client 210, a policy database 304, remote devices 306, remote instances 308, a token repository 312, and a token inspector 314.

The mid-link server 108 hosts many different enterprises and domains keeping usage from their different client device(s) 102 separated. In other cases, the mid-link server 108 could be dedicated to a particular enterprise and hosted inside their network or the LAN 204 or with a third party hosting service. In any event, each remote instance 308 is dedicated to a client device 102 for use, although the IT staff have access to update software, apply policies, make configuration changes, modify admin settings and rights, etc. to maintain the remote instance 308. The client 210 connect with the client device(s) 102 over the Internet 310 in digitally segregated connections. The policies operate in higher levels of the Open Systems Interconnection (OSI) model, such as the application layer to provide enhanced control.

In an embodiment, the remote devices 306 may be physical remote devices 306 and the remote instances 308 may be virtual-machine remote instances 308. Both the physical remote devices 306 and the virtual-machine remote instances 308 are supported to run software environments. For example, the physical remote devices 306 may be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in a secure, controlled and potentially high performance instantiations. The remote instances 308 host content sites, websites or streaming content for the client device(s) 102. The router 302 provides communication between the client 210 and the remote instances 308. The router 302 allows the access or denial of the tokens based on the communication from the token inspector 314 before the token is used at the remote instances 308.

The remote devices 306 are physical hardware that hosts the remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end user 106 to control the remote instance 308.

The policy database 304 includes a list of policies for setting up an access link between the client device 102 and the remote instances 308 using authorized tokens. The policy database 304 also includes a list of authorized applications based on which the connection with the remote instances 308 is established. The token and the application to be used is matched within the list of policies and their corresponding applications for establishing the connection. The policies are set by the administrator of the enterprise. By way of an example, the tokens of the calendar application may be allowed, and the tokens of a social media app may not be allowed based on the policies. In other embodiments, these policies are further modified based on the new policies or requirements of the enterprise. Usage history of the tokens further influences the modification of the policies associated with the tokens. For example, based on a token disabled by the administrator in the past, the policy may require the token to be re-authorized. By way of another example, the applications may be re-authorized by the administrator based on receiving a re-authorization request from the end user 106 regarding denial of the token for the application. Each token is associated with a threat level and a confidence score. The threat level indicates security issues related to the tokens. The confidence score indicates trustworthiness of the tokens. The threat level and the confidence score influence the authorization of the token.

The token repository 312 includes a database of the tokens either authorized or restricted by the administrator or the enterprise/tenants of the end user 106 of the client device 102 for accessing the service(s) 112. The token repository 312 includes a list of the tokens from the policy store 110 which is categorized by the token inspector 314 based on their respective policies. The token repository 312 further includes the tokens categorized as authorized, trustworthy, malicious, nefarious, compromised, bad, unauthorized, or anonymous. The tokens may also be categorized based on a business category like Enterprise resource planning (ERP) and Human Resource Information System (HRIS) or personal and enterprise. The token categorization helps the token inspector 314 to request for re-authorization to the administrator or flag an alert to the client device 102. In case of a newly found token, the token is authorized by the token inspector 314 and then re-authorized by the administrator in the IT module 214 or the end user 106 of the client device 102. The new token is categorized and added by the token inspector 314 in the token repository 312 after the authorization.

The token inspector 314 retrieves the policies corresponding to the tokens and applications from the policy database 304 to monitor the tokens. The token inspector 314 categorizes the tokens in the token repository 312 based on the policies set by the administrator or the enterprise. The token inspector 314 subcategorizes the tokens as authorized, malicious, nefarious, compromised, unauthorized, or anonymous based on an analysis of the tokens. The token inspector 314 monitors each token, matches the token with the list of tokens in the token repository 312, correlates the token with the list of the tokens in the policy database 304, identifies the corresponding applications and policies associated with it and determines whether the token is authorized to be used. Based on the monitoring, the token inspector 314 allows the token to be used by the user app 206 at the router 302 for accessing the service(s) 112 from the remote instances 308.

The token inspector 314 further keeps a log of tokens each time the tokens are used for the service(s) 112. A compliance with the respective policies is checked in order to track any compromise or misconduct in complying the policy. There may be malicious or unidentifiable tokens that creates the non-compliance. Unidentified, unauthorized or malicious tokens are flagged to the IT module 214 for re-authorization. For example, the token inspector 314 determines the threat level associated with the token, categorizes the token as malicious based on the threat levels, and flags the client device 102 and/or the IT module 214 for inspection and re-authorization. Based on the compliance with the policies and the threat levels, the tokens are scored and ranked.

Figure 4:
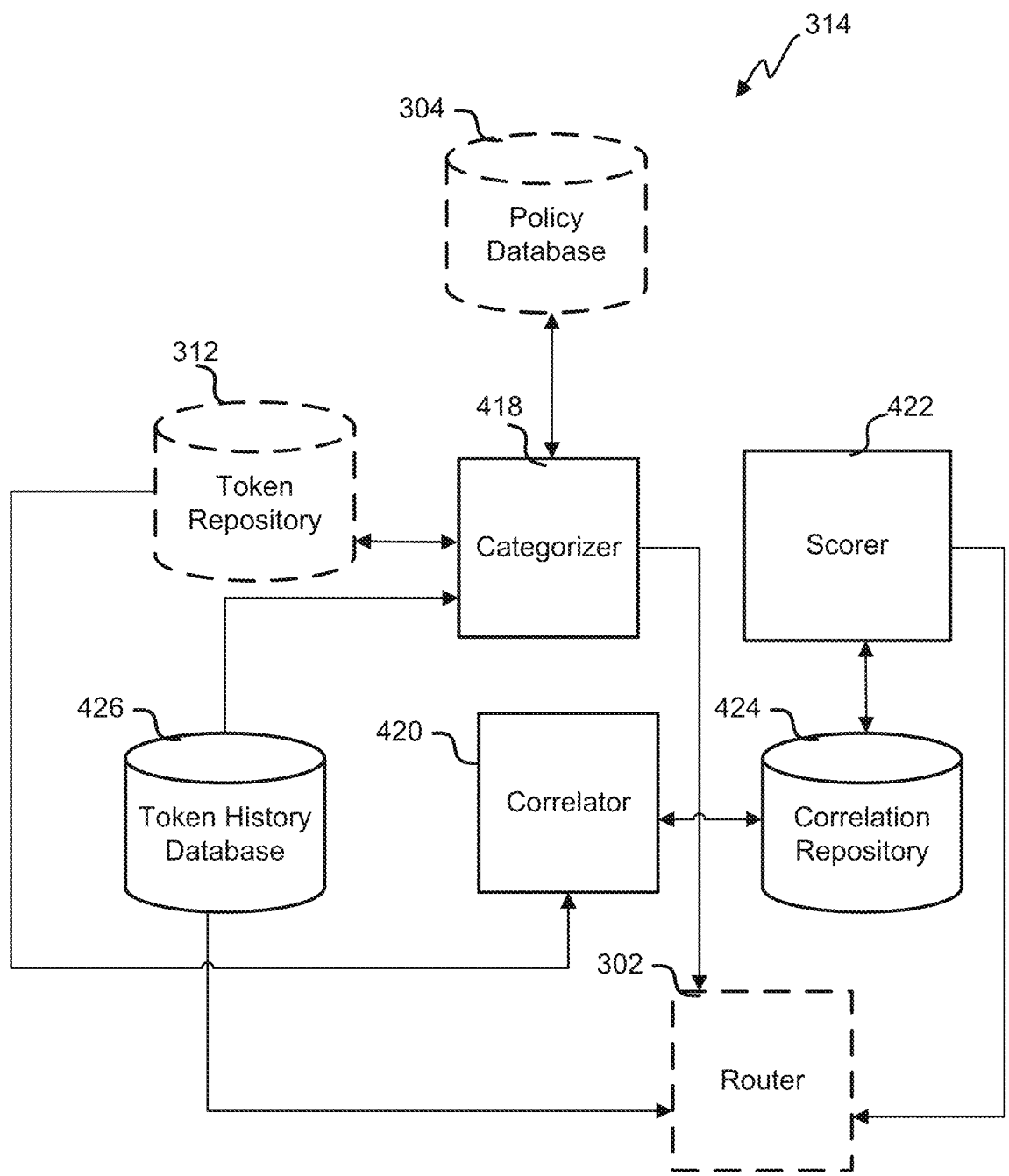
FIG. 4 illustrates a block diagram of a token inspector that categorizes, correlates, and scores tokens.

Referring next to FIG. 4, a block diagram of the token inspector 314 configured to categorize, correlate, and score the tokens is shown. The token inspector 314 includes a categorizer 418, a correlator 420, a scorer 422, a correlation repository 424, and a token history database 426.

The categorizer 418 receives the list of policies for the tokens as set by the administrator or the enterprise/tenants from the policy database 304. The categorizer 418 uses the list of policies to categorize each of the tokens in the token repository 312. The tokens are categorized into multiple categories based on their respective policies. The tokens are further subcategorized into a list of categorized tokens based on the threat level associated with them. For example, the threat level is used to categorize the token as the malicious token. The malicious token is inspected and re-authorized. The categorizer 418 identifies each of the tokens and compares them with user logs in the token history database 426 to determine the threat level associated with them.

For example, a token used in past for accessing an application was blocked by the administrator multiple times. The threat level for such token is considered as high. Accordingly, the token is subcategorized as malicious and bad. Another token that was never blocked by the administrator but restricted by the client device 102, has the threat level of 8 and the token is therefore, subcategorized as nefarious. Some tokens may be unidentifiable. These tokens are subcategorized as anonymous. The tokens that are new and do not have a past usage are categorized as new. The categorizer 418 includes machine learning algorithms for analytics and machine based learning to categorize the tokens based on usage. The token may also be subcategorized as blocked in case the token was blocked in the past. The categorizer 418 flags an alert to the IT module 214 or to the end user 106 of the client device 102 for re-authorization via the router 302. The categorization is based on machine learning algorithms or fuzzy logic. The categorizer 418 continuously monitors and updates the categories of the tokens based on the user logs from the token history database 426.

The correlator 420 uses the list of categorized tokens in the token repository 312 to match a token received from a request of the client device 102. If the token is found matching within the list of categorized tokens, the policy associated with the matched token and the corresponding application for which it is used are identified. If the token is identified as authorized as per the policy of the token, the token is allowed to be used. If the token is found unauthorized, the token is reported for re-authorization to the IT module 214. The correlated tokens are stored in the correlation repository 424 for further analysis.

The correlation repository 424 is a database for the correlated tokens. After being matched with the list of categorized tokens in the correlator 420, the tokens are stored in the correlation repository 424.

The token history database 426 stores the usage history of the tokens acquired from logs of the client device(s) 102. The usage history also includes administrator reports and user reports. The administrator reports include information on blocked tokens, re-authorized tokens or unidentified tokens obtained from the administrator. Also, information on the tokens from the client device 102 and other data sources such as blogs, websites and social media are incorporated in the user reports. The usage history is useful in categorizing and identifying the tokens. The usage history is shared with the IT module 214 for further analysis via the router 302.

The scorer 422 retrieves the correlated tokens from the correlation repository 424. The scorer 422 assigns one or more confidence scores to each of the tokens based on their categories, compliance with the policies, and the threat level. A machine learning algorithm may be used to assign the one or more confidence scores to the tokens. The confidence scores indicate a need to re-authorize the tokens and/or disable them temporarily. The scores may be numerical values, heat maps, or charts. By way of an example, high confidence scores may indicate a higher trust in the token in terms of security whereas low confidence scores may indicate a lower trust in the token in terms of security. The tokens have metadata, and the tokens are also categorized based on the metadata. The confidence scores also depend on the metadata. The confidence scores may further be used to rank the tokens in the order of their scores. The confidence scores may also be updated based on changes in the policies, categories, and/or usage. The confidence scores of each of the tokens are provided to the IT module 214 and/or the end user 106 of the client device 102 via the router 302 for further analysis.

Figure 5:
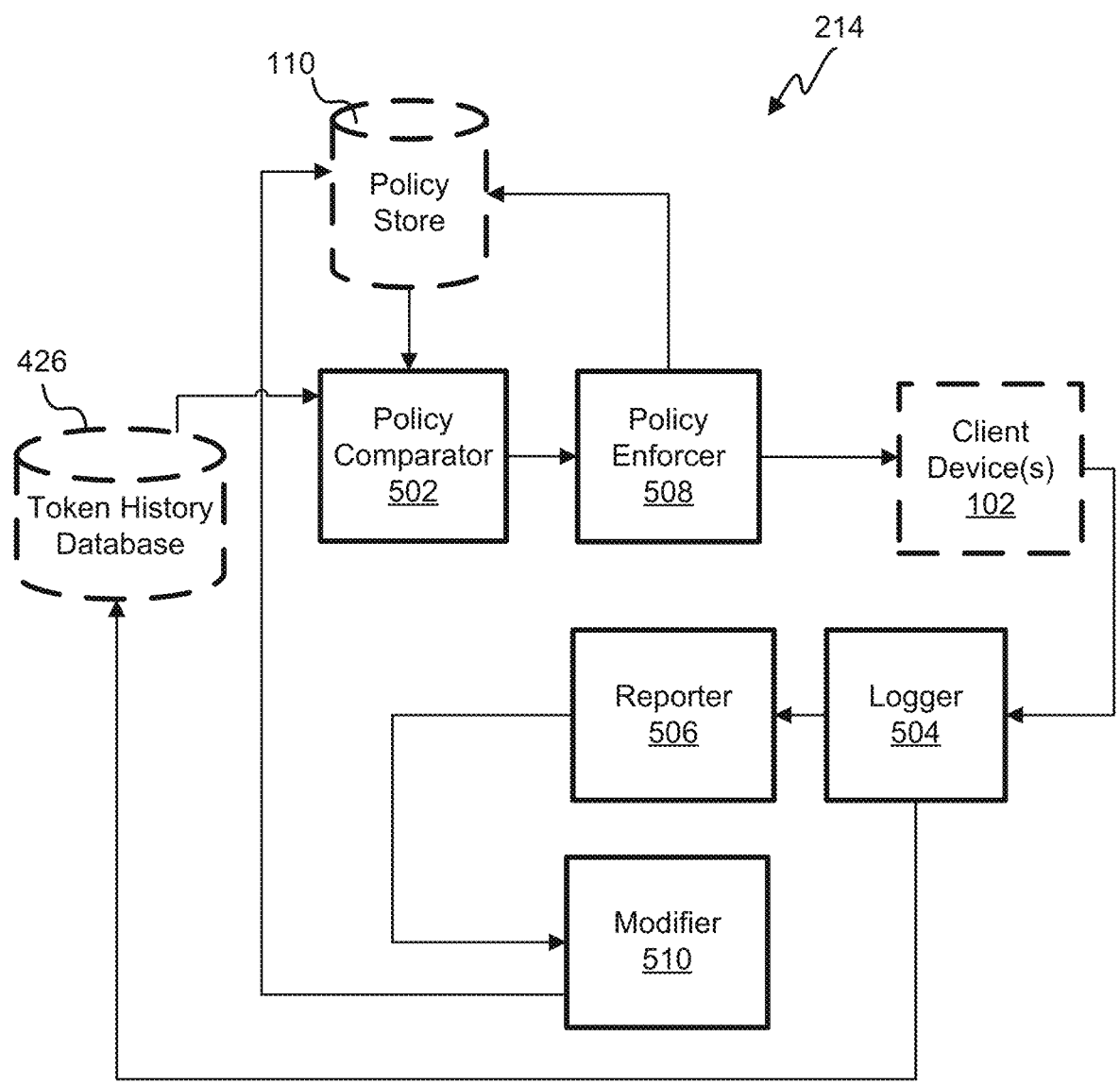
FIG. 5 illustrates a block diagram of an IT module that monitors tokens.

Referring next to FIG. 5, a block diagram of the IT module 214 configured to monitor the tokens is shown. The IT module 214 includes a policy comparator 502, a logger 504, a reporter 506, a policy enforcer 508, and a modifier 510. The IT module 214 provides an interface for an administrator or IT staff of the enterprise of the end user(s) 106 for analyzing log reports and assigning policies to the client device(s) 102. The administrator of the enterprise reviews the policies, the tokens, and the remote applications. The administrator may also modify the policies by updating and/or upgrading the policies using the IT module 214.

The policy comparator 502 receives the usage history from the token history database 426 acquired from user logs of the client device(s) 102, communications between services, and/or communication between servers. The usage history includes administrator reports and user reports on the tokens used in the past. The administrator reports include the information on blocked tokens, re-authorized tokens and/or unidentified tokens provided by the administrator. The information further clarifies reasons for blocking and re-authorizing the tokens. Identification and categorization information on the unidentified tokens and threat levels associated with the blocked tokens, re-authorized tokens and/or the unidentified tokens are also included in the administrator reports.

The user reports include information on the tokens from the client device 102 such as enabling or disabling the token or generating an alert for the token. Other data sources such as blogs, websites, databases, and social media on the tokens are included in the user reports. Machine learning or artificial intelligence algorithms may be used to acquire the information. The administrator reports and the user reports on the tokens are obtained from the logger 504 and stored in the token history database 426. The policy comparator 502 further matches each of the tokens used by the application of the client device 102 within a token mapping list stored in the policy store 110. After matching the tokens, their respective policies or the modified policies are identified from the token mapping list. A comparison output is generated based on the comparison of each token with the respective policy, user action, and the token created or authorized at the time of the user action. For example, the tokens created, or authorized versus deleted and de-authorized tokens. The comparison output is provided to the policy enforcer 508 for further analysis.

The policy enforcer 508 identifies any compliance related issues with the past and current tokens based on the output and enforces the policies to the client device(s) 102. The policy enforcer 508 sets the policies in the policy store 110 based on the user logs, tenants of the client device(s) 102, confidentiality associated with the service(s) 112, the remote applications used for the services, a type of the client device 102, and/or user designation of the end user(s) 106. By way of an example, a policy A for a token A is identified by the policy comparator 502 based on a comparison of the token A with the list of policies in the policy store 110. A corresponding output including the specification of the policy A is provided to the policy enforcer 508. The policy enforcer 508 checks that the token A was used in accordance with the policy A. The policy A of the token A specifies that the token A is authorized to use for a service A using a remote application A. The policy enforcer 508 allows the token A to be used by the application of the client device 102. Based on the user logs, the policy enforcer 508 confirms that the token A used is in compliance with the policy A. By way of another example, the comparison output from the policy comparator 502 specifies a policy B for a token B which specifies that token B is compromised. The policy enforcer 508 checks that the token B being compromised requires re-authorization. The policy enforcer 508 temporarily disables the token B. The policy enforcer 508 alerts the administrator to inspect the token B. Based on approval or denial by the administrator, the policy enforcer 508 controls the use of the token B at the client device 102.

The logger 504 is a repository of log reports of the tokens used at the client device(s) 102. The logger 504 also stores past log reports of policies implemented on the client device(s) 102. The logger 504 continuously monitors the tokens used by the applications of the client device(s) 102 and gathers log data from the client device(s) 102. The log reports are provided to the reporter 506 for further analysis.

The reporter 506 is an interface to facilitate the administrator to analyze the log reports of the past and current tokens of the client device(s) 102 obtained from the logger 504. The interface is coupled to a memory and a processor of a display device having an input/output devices for communication. The administrator re-authorizes, allows, partially allows, temporarily disables or permanently disables the tokens using the reporter 506. Based on the re-authorization, either the token is allowed or blocked or partially allowed for a restricted time duration. The administrator further modifies the policies based on the re-authorization using the reporter 506. The reporter 506 indicates the alerts to the administrator regarding non-compliance of the policies and the threat levels associated with the tokens from the end user(s) 106 of the client device(s) 102, the logger 504, and the mid-link server 108. The administrator may perform certain actions with respect to the non-compliance of policies and the unauthorized tokens. The administrator may send information on modification of the policies to the modifier 510 for further processing.

The modifier 510 processes the information from the reporter 506 to modify the policies. For example, the client device 102 may be enforced with updated policies and the corresponding tokens. The threat levels associated with the tokens are updated from time to time which require the policies to be updated in the policy store 110. Newly identified or unidentifiable tokens further require re-authorization from the administrator. The policies are updated after re-authorization of the tokens. Based on a history of the tokens and the threat level associated with the tokens and the remote applications, the policies may be modified and implemented. The administrator provides the modified policies for storage in the policy store 110.

Figure 6:
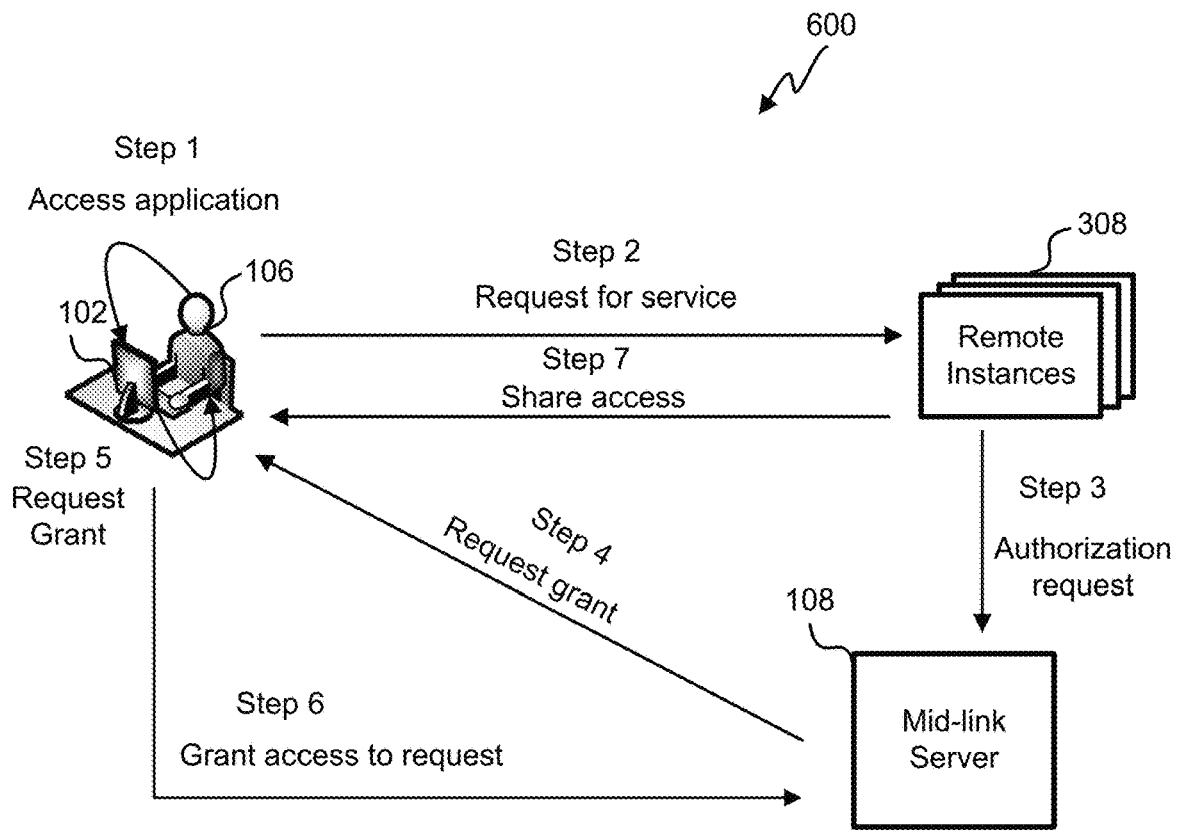
FIG. 6 illustrates a flow diagram of communication between an end user at a client device, a mid-link server, and remote instances at a web server for accessing services.

Referring next to FIG. 6, a flow diagram of communication between the end user 106 at the client device 102, the mid-link server 108 and the remote instances 308 at the web server 104 for accessing the service(s) 112 is shown.

At step 1, the end user 106 uses a local application running on the client device 102 to request a remote instance 308 for accessing a service 112. At step 2, the request is sent to a remote application running on the remote instance 308 for the service 112 using a token. At step 3, the remote instance 308 sends an authorization request to the mid-link server 108 to authorize the token based on a policy associated with the token. The policy is associated with the token that is used to establish communication with the web server 104. For example, a policy requires an OAuth access token to communicate with the remote application. Policies are predefined by the administrator or the enterprise of the end user 106 based on a type of service, a type of the remote application, user group, a business unit, a user profile, a user device, remote working hours, network connection, and/or geolocation. The policies are enforced by an administrator at the client device 102 referred to as a first mile, the policies are inspected at the mid-link server 108 referred as a middle mile, and the policies are implemented at the web server 104 referred as the last mile.

The mid-link server 108 checks the token corresponding to the policies. The mid-link server 108 performs inspection at the middle mile using the policies from the list of policies stored in the token repository 312. If the mid-link server 108 determines that the token used to the web server 104 are in nonconformity with the policies, an alert is sent to the IT staff to resolve the issue. The determination may be based on machine learning algorithms. However, if the mid-link server 108 determines that the token is in accordance with the policies, then the token is authorized, and the request is granted to the local application on the client device 102 at step 4.

At step 5, the local application requests the end user 106 to grant access to the token for being used at the remote application. At step 6, the end user 106 grants the access to the local application for use of the token. At step 7, the remote application shares the access to the service 112 with the local application based on the token. The connection is established between the local application of the client device 102 and the remote application of the remote instance 308 via the mid-link server 108 and the service 112 is provided to the end user 106.

Figure 7:
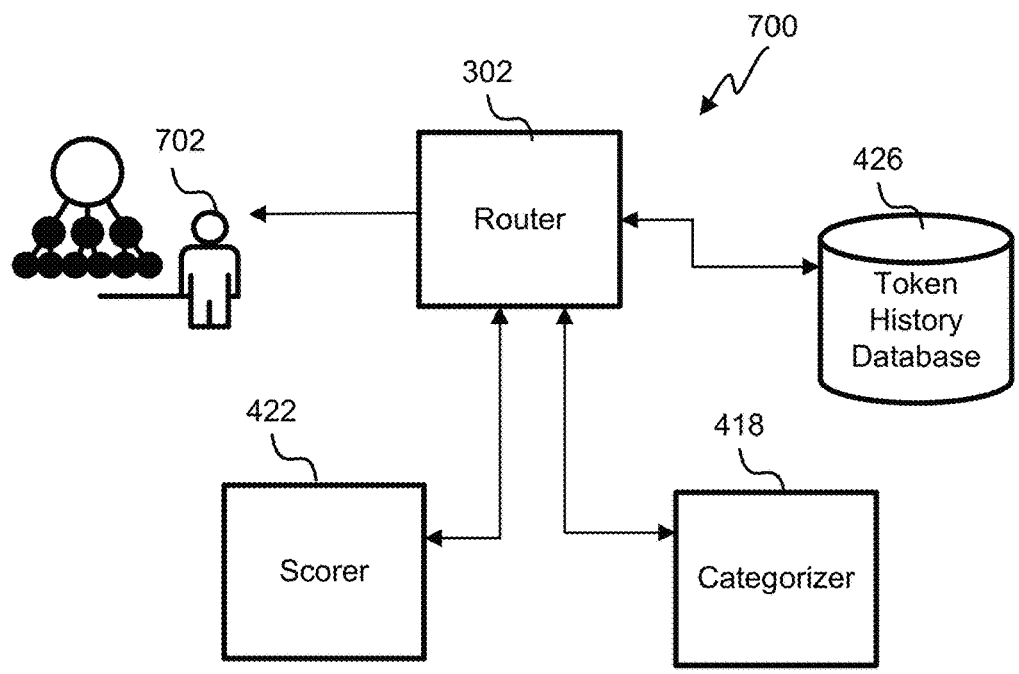
FIG. 7 illustrates an embodiment of a communication between components of a token inspector and an administrator of an enterprise via a router.

Referring next to FIG. 7, an embodiment of a communication 700 between components of the token inspector 314 and an administrator 702 of an enterprise via the router 302 is shown. The router 302 of the mid-link server 108 is used to communicate with the administrator 702 of the IT module 214. The router 302 provides the usage history of the tokens to the administrator from the token history database 426. The categorized tokens are provided to the administrator 702 from the categorizer 418 via the router 302. The confidence scores of the tokens are communicated to the administrator 702 from the scorer 422 using the router 302. The administrator 702 reviews information received from the token history database 426, the categorizer 418 and the scorer 422 to take a decision on re-authorization or disabling of the tokens. The information is critical to the security of the enterprise. The administrator 702 monitors the tokens based on the information received via the router 302.

Figure 8:
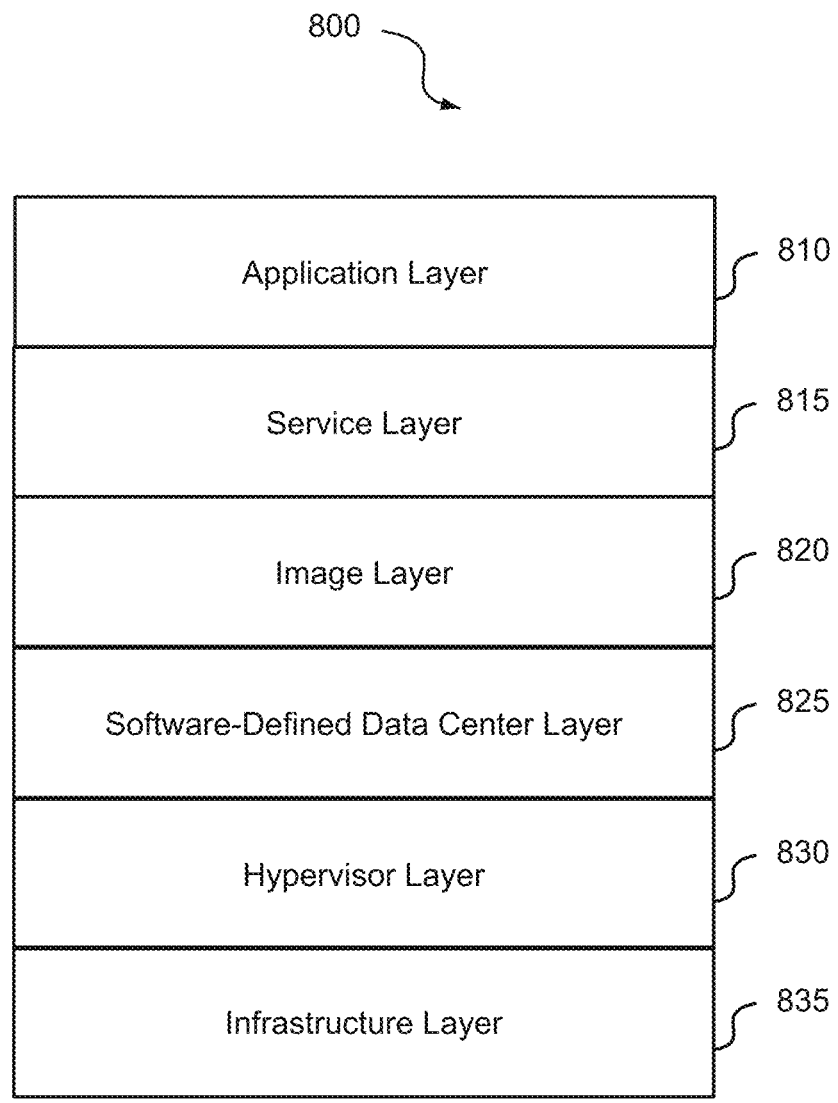
FIG. 8 illustrates a block diagram of a cloud OSI model for cloud computing environments.

Referring next to FIG. 8, a block diagram of an embodiment of a cloud OSI model for cloud computing environments is shown. The cloud OSI model 800 for cloud computing environments partitions the flow of data in a communication system into six layers of abstraction. The cloud OSI model 800 for cloud computing environments may include, in order, an application layer 810, a service layer 815, an image layer 820, a software-defined data center layer 825, a hypervisor layer 830, and an infrastructure layer 835. Each layer serves a class of functionality to the layer above it and is served by the layer below it. Classes of functionality may be realized in software by various communication protocols.

The infrastructure layer 835 may include hardware, such as physical devices in a data center, that provides the foundation for the rest of the layers. The infrastructure layer 835 may transmit and receive unstructured raw data between a device and a physical transmission medium. For example, the infrastructure layer 835 may convert the digital bits into electrical, radio, or optical signals.

The hypervisor layer 830 may perform virtualization, which may allow the physical devices to be divided into virtual machines that can be bin packed onto physical machines for greater efficiency. The hypervisor layer 830 may provide virtualized compute, storage, and networking. For example, OpenStack® software that is installed on bare metal servers in a data center may provide virtualization cloud capabilities. The OpenStack® software may provide various infrastructure management capabilities to cloud operators and administrators, and may utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 825 may provide resource pooling, usage tracking, and governance on top of the hypervisor layer 830. The software-defined data center layer 825 may enable the creation virtualization for the Infrastructure-as-Code concept by using representational state transfer (REST) Application Programming Interfaces (APIs). The management of block storage devices may be virtualized, and end users may be provided with a self-service API to request and consume those resources without requiring any knowledge of where the storage is actually deployed or on what type of device. Various compute nodes may be balanced for storage.

The image layer 820 may use various operating systems and other pre-installed software components. Patch management may be used to identify, acquire, install, and verify patches for products and systems. Patches may be used to correct security and functionality problems in software. Patches may also be used to add new features to operating systems, including security capabilities. The image layer 820 may focus on the compute instead of storage and networking. The instances within the cloud computing environments may be provided at the image layer 820.

The service layer 815 may provide middleware, such as functional components that applications use in tiers. In some examples, the middleware components may include databases, load balancers, web servers, message queues, email services, or other notification methods. The middleware components may be defined at the service layer 815 on top of particular images from the image layer 820. Different cloud computing environment providers may have different middleware components.

The application layer 810 may interact with software applications that implement a communicating component. The application layer 810 is the layer that is closest to the end user 106. Functions of the application layer 810 may include identifying communication partners, determining resource availability, and synchronizing communication. Applications within the application layer 810 may include custom code that makes use of middleware defined in the service layer 815.

Various features discussed above may be performed at one or more layers of the cloud OSI model 800 for cloud computing environments. For example, translating the general policies into specific policies for different cloud computing environments may be performed at the service layer 815 and the software-defined data center layer 825. The policies and the tokens operate at the application layer 810. Various scripts may be updated across the service layer 815, the image layer 820, and the software-defined data center layer 825. Further, APIs and policies may operate at the application layer 810 that is at a web browser.

Each of the different cloud computing environments may have different service layers 815, image layers 820, software-defined data center layers 825, hypervisor layers 830, and infrastructure layers 835. Further, each of the different cloud computing environments may have an application layer 810 that can make calls to the specific policies in the service layer 815 and the software-defined data center layer 825. The application layer 810 may have substantially the same format and operation for each of the different cloud computing environments. Accordingly, developers for the application layer 810 may not need to understand the peculiarities of how each of the cloud computing environments operates in the other layers.

Figure 9:
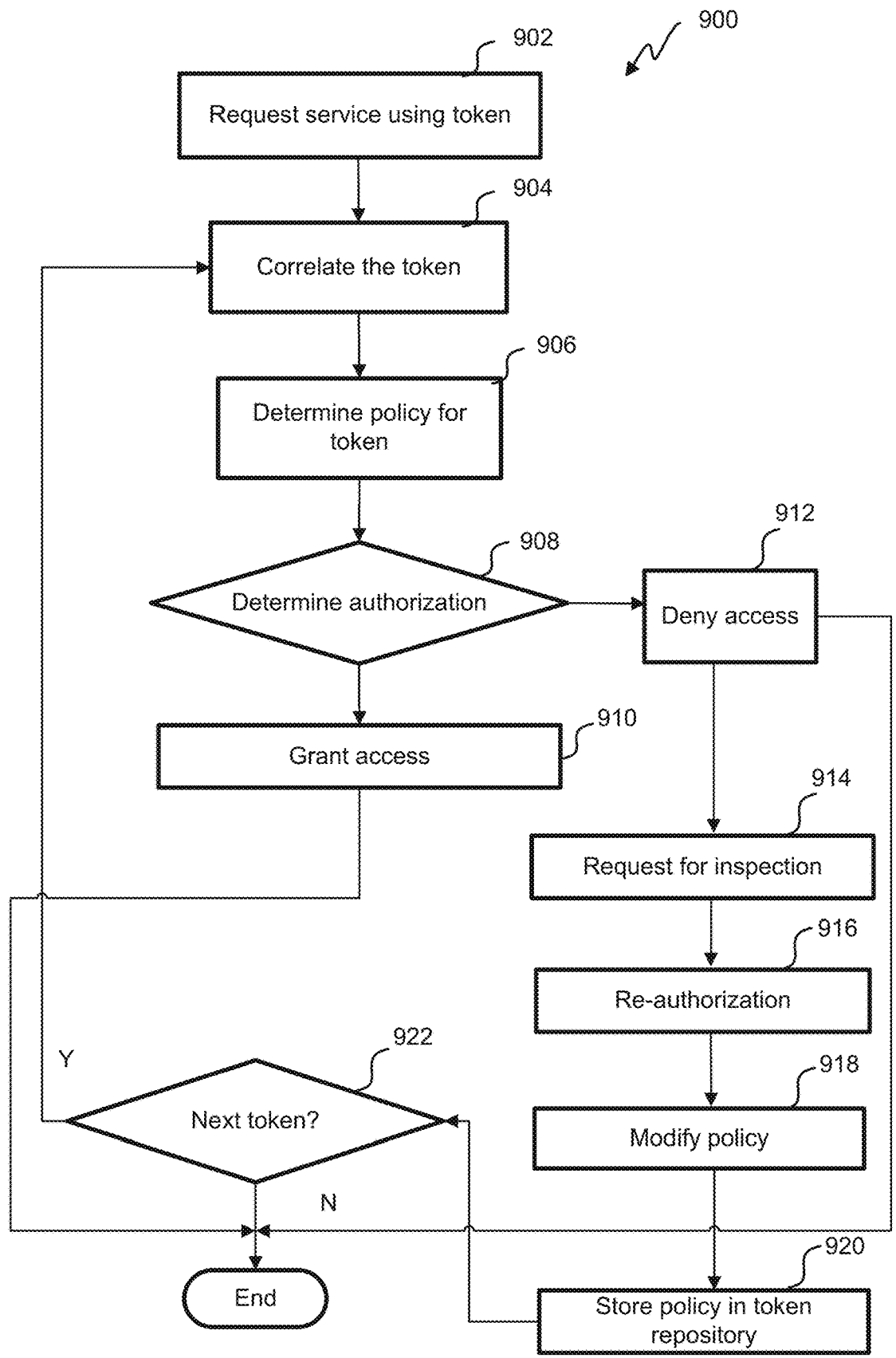
FIG. 9 illustrates a flowchart of a policy controlled token authorization and inspection process for a client device.

Referring next to FIG. 9, a flowchart of an embodiment of a policy controlled token authorization and inspection process 900 for a client device 102 is shown. The depicted portion of the process begins at block 902 where an end user 106 of the client device 102 loads browser or a local application at the client device 102 to request a service. A token is used for accessing the service. The end user 106 desires to access the service at a first mile by sending the request using the token to a remote application at the web server 104. The user initiates the request for access to the service to the web server 104 to the mid-link server 108. The mid-link server 108 acts as an intermediate server controlling the token at a middle mile based on a set of policies. The web server 104 provides the service to the end user 106 at a last mile.

At block 904, the token received with the request is correlated with a number of tokens in the token repository 312 of the mid-link server 108. The token repository 312 includes a list of the tokens categorized with their policies from the policy store 110. In another embodiment, the correlation is performed at the client device 102 by comparing the token with the stored tokens in the policy cache 208. The tokens in the policy cache 208 correspond to the tokens in the policy store 110.

At block 906, after the correlation is performed, a policy associated with the token is identified. The policy specifies use of the token to access the remote application for the service.

At block 908, an authorization associated with the token is determined based on the identified policy and the threat level associated with the token. The tokens are categorized with their policies and authorization from an administrator, the client device 102, and/or a tenant enterprise in the policy store 110.

The tokens are subcategorized with the threat level associated with them. For example, a token may be determined as unauthorized based on the policy and the subcategory—malicious. Another token may be authorized based on the policy and subcategory—trustworthy. If the token is determined to be authorized based on the policy, then at block 910, access is granted to the client device 102 to use the token for accessing the service and the process ends. If the token is determined to be unauthorized then at block 912, the token is disabled. The client device 102 is notified of the unauthorized token. The client device 102 may either request the administrator for re-authorization at block 916 or end the process.

At block 914, the client device 102 requests the administrator to inspect the token and re-authorize the token. The client device 102 sends the request for inspection via the IT module 214.

At block 916, the token is re-authorized by the administrator after receiving the request for inspection and re-authorization. Based on the re-authorization, either the token is allowed or blocked or partially allowed for a restricted time duration. The token may be temporarily disabled for a time duration for example, 24 hours, two days, six months, or one year. The token may be permanently disabled or allowed without time limit.

At block 918, the policy associated with the token is modified and the subcategory may also be modified based on the re-authorization. The policy store 110 is updated with the modified policy and the subcategory and/or other updates. The policy may however not require modification if the re-authorization result is the same as the authorization result. In such cases, the policy remains same.

At block 920, the modified policy stored in the policy store 110 is updated in the token repository 312. The token repository 312 accordingly updates the list of the policies with their corresponding tokens.

At block 922, next token is determined from the client device 102. If the client device 102 request to access the same or another service using a new token, the process moves at block 904 where the new token is correlated in the token repository 312 else the process ends.

Figure 10:
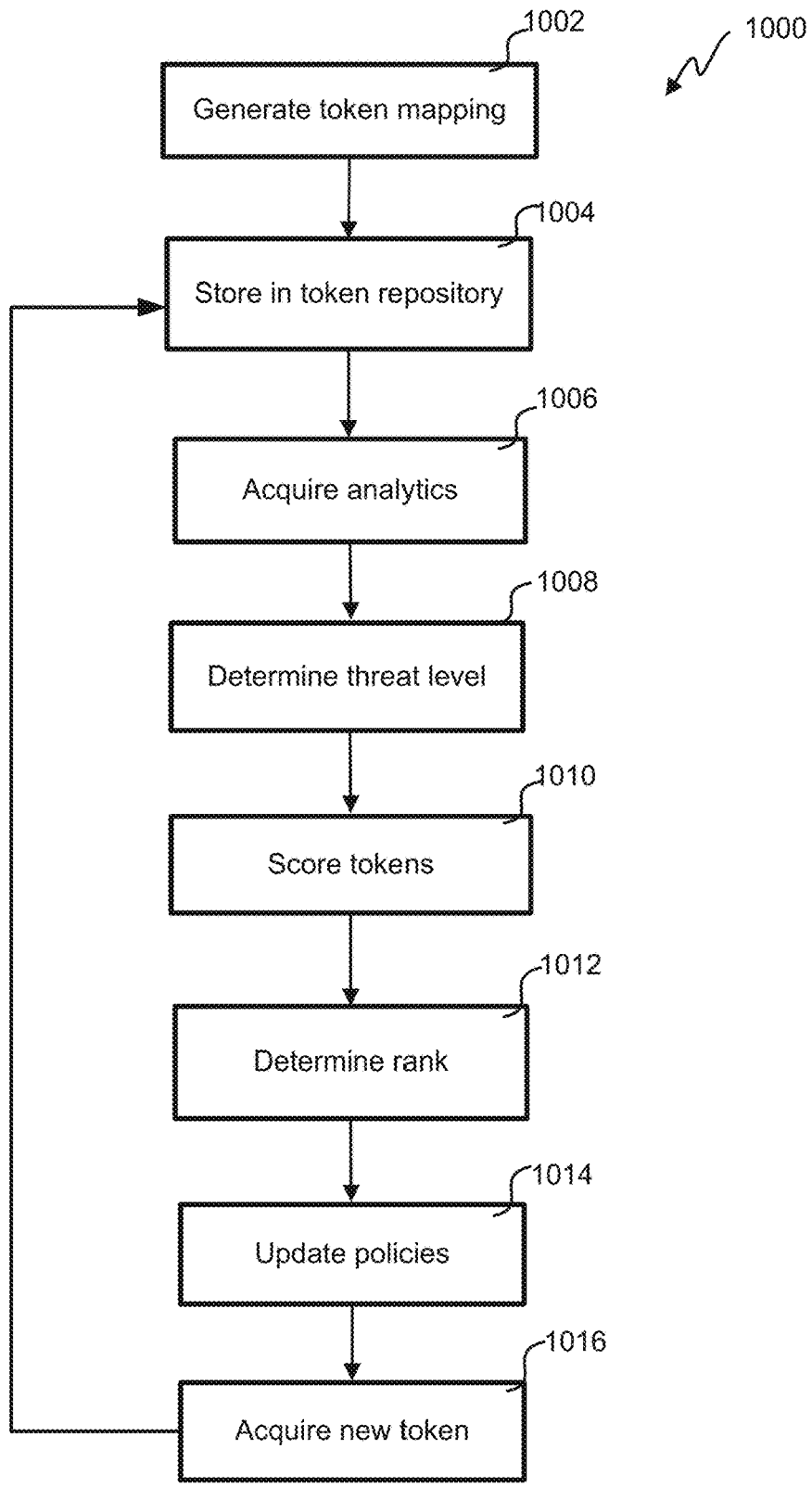
FIG. 10 illustrates a flowchart of an embodiment of a policy controlled token management process.

Referring next to FIG. 10, a flowchart of an embodiment of a policy controlled token management process 1000 is shown. The depicted portion of the process begins in block 1002 where a token mapping is generated by the administrator and/or the enterprise at the IT module 214. Policies are preset by the administrator based on user logs, tenants of the client device(s) 102, confidentiality associated with the service or the remote applications, types of the client device(s) 102 such as mobile, PC, or laptop, and/or a user designation associated with the client device such as manager, trainee, or employee. The token mapping includes a list of tokens mapped with their corresponding policies, remote applications, and categories such as authorized and unauthorized.

At block 1004, the token mapping is stored in the token repository 312 of the mid-link server 108 by the IT module 214. The token repository 312 includes the token mapping for further comparison of the tokens from incoming requests from the client device(s) 102.

At block 1006, analytics on the tokens in the token repository 312 is acquired by the mid-link server 108 from token usage history. The token usage history of each of the tokens is acquired from the token history database 426. The analytics is also acquired in the form of log reports from the administrator via the IT module 214.

At block 1008, a threat level associated with the tokens is identified using the acquired analytics by the mid-link server 108. The threat level is determined based on the category of the token, token usage history, data sources such as blogs, websites, social media, and/or the log reports of the administrator. The threat level may be a numerical value for example, on a scale of 1 to 10 indicating a security threat associated with each of the tokens. In other embodiments, one or more other ways of interpreting the threat levels such as pie charts, heat maps, ranking or bar graphs may be used. The threat level of the tokens may be presented to the end user 106 on the client device 102 and the administrator via the IT module 214 for resolution.

At block 1010, the tokens are scored by the scorer 422 of the mid-link server 108 based on the threat level associated with them and compliance with their respective policies in the past. Each token may be assigned a confidence score indicating a level of security in their usage. The confidence scores may be numerical values ranging over 10-100 with 100 being the best score. However, other methods of representing the confidence scores may also be used. Machine learning techniques may be used for scoring the tokens. The machine learning techniques learn from the scoring and continuously monitors changes on status pf the tokens, accordingly, scores are also updated.

At block 1012, the tokens are ranked based on their confidence scores and the threat levels. The mid-link server 108 may use fuzzy logic or artificial learning tools to rank the tokens in the order of their confidence scores and the threat levels.

At block 1014, based on the confidence scores of the tokens, the policies may require an update. For example, a token may initially have a confidence score of 60, however from the token usage history, the analytics indicate that the token was re-authorized and allowed a number of times for a specific time duration. This resulted in an improved confidence score of 80 and accordingly its policy is updated. Further, historical or retrograde analysis may also be used to analyze the authorized tokens based on source or destination that could be used for forensics at a later date.

At block 1016, a new token for a new request is received from the client device(s) 102. The new token is compared with the tokens in the token repository at block 1004. In case, the new token is not found in the token repository 312, its stored in the token repository 312 as a new token.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A policy-controlled authorization system for managing tokens used to access services in a cloud based multi-tenant system, the policy-controlled authorization system comprising:
a client device having a local application, the local application:
executes on the client device and
provides a request for access to a service on a remote application running on a remote instance of a web server, wherein a token is required to access the service;
a policy component including a plurality of policies, wherein the plurality of policies specify access to a plurality of remote applications to be used at the client device for accessing a plurality of services using a plurality of tokens; and
a mid-link hardware server, coupled to the client device, the mid-link hardware server comprising:
a router to provision the plurality of policies for the service to the web server;
a token inspector to:
correlate the token with the plurality of tokens in the policy component for identifying a policy from the plurality of policies associated with the token, wherein the plurality of tokens is categorized in a token repository based on the plurality of policies;
authorize the token for accessing the service based on the correlation; and
based on the authorization, either:
authorize the token for access to the service via the remote application, or
block the token when unauthorized to prevent access to the service,
wherein the policy associated with the token is modified based on re-authorization of the token by an administrator, and a threat level associated with the token and the remote application, the threat level is determined based on a usage history of the token, and the usage history of the token includes:
administrator reports including information from the administrator on blocked tokens, re-authorized tokens and unidentified tokens, and user reports including information on the tokens from the client device.

2. The policy-controlled authorization system for managing tokens used to access services in a cloud based multi-tenant system as recited in claim 1, wherein the token inspector transmits the request to an administrator for an inspection, wherein the policy associated with the token is modified based on the inspection, and the token is reauthorized based on the modified policy.

3. The policy-controlled authorization system for managing tokens used to access services in a cloud based multi-tenant system as recited in claim 1, wherein a confidence score is generated by the mid-link server for the token, and the confidence score is based on the threat level associated with the token.

4. The policy-controlled authorization system for managing tokens used to access services in a cloud based multi-tenant system as recited in claim 1, wherein the plurality of policies is set based on user logs, a tenant of the client device, confidentiality associated with the service or the plurality of remote applications, a type of the client device, and/or a user designation associated with the client device.

5. The policy-controlled authorization system for managing tokens used to access services in a cloud based multi-tenant system as recited in claim 1, wherein a time duration for use of the token to access the service is restricted by an administrator.

6. The policy-controlled authorization system for managing tokens used to access services in a cloud based multi-tenant system as recited in claim 1, wherein the token inspector of the mid-link server:
   determines the threat level associated with the token, wherein the threat level is used to categorize the token as a malicious token; and
   indicates an inspection for the malicious token, wherein the inspection is performed at the client device and the malicious token is re-authorized by an administrator based on the inspection.

7. The policy-controlled authorization system for managing tokens used to access services in a cloud based multi-tenant system as recited in claim 1, wherein the plurality of policies and the plurality of tokens operate at an application layer.

8. A method for policy-controlled management of tokens for providing secure access to services in cloud-based multi-tenant systems, the method comprising:
   requesting by a local application running on a client device access to a service on a remote application running on a remote instance of a web server, wherein a token is required to access the service;
   correlating the token with a plurality of tokens in a token repository for identifying a policy from a plurality of policies associated with the token, wherein:
   the plurality of policies specify access to a plurality of remote applications to be used at the client device for accessing a plurality of services using the plurality of tokens, and
   the plurality of tokens is categorized in the token repository based on the plurality of policies;
   determining an authorization by a mid-link server corresponding to the token for accessing the service based on the correlation; and
   in response to determining the authorization, either:
   authorizing the token for accessing the service via the remote application, or
   blocking the token when unauthorized to prevent access to the service, wherein the policy associated with the token based on re-authorization of the token by an administrator, and a threat level associated with the token and the remote application, the threat level is determined based on a usage history of the token, and the usage history of the token includes:

administrator reports including information from the administrator on blocked tokens, re-authorized tokens and unidentified tokens, and
user reports including information on the tokens from the client device.

9. The method for policy-controlled management of tokens for providing secure access to services in cloud-based multi-tenant systems as recited in claim 8, further comprising transmitting a request to an administrator for an inspection, wherein the policy associated with the token is modified based on the inspection, and the token is reauthorized based on the modified policy.

10. The method for policy-controlled management of tokens for providing secure access to services in cloud-based multi-tenant systems as recited in claim 8, wherein a confidence score is generated by the mid-link server for the token, and the confidence score is based on the threat level associated with the token.

11. The method for policy-controlled management of tokens for providing secure access to services in cloud-based multi-tenant systems as recited in claim 8, wherein the plurality of policies is set based on user logs, a tenant of the client device, confidentiality associated with the service or the plurality of remote applications, a type of the client device, and/or a user designation associated with the client device.

12. The method for policy-controlled management of tokens for providing secure access to services in cloud-based multi-tenant systems as recited in claim 8, wherein a time duration for use of the token to access the service is restricted by an administrator.

13. The method for policy-controlled management of tokens for providing secure access to services in cloud-based multi-tenant systems as recited in claim 8, further comprising determining by the mid-link server for the client device, the threat level associated with the token, wherein:
   the threat level is used to categorize the token as a malicious token,
   the determination indicates an inspection for the malicious token,
   the inspection is performed at the client device; and
   the malicious token is re-authorized based on the inspection.

14. The method for policy-controlled management of tokens for providing secure access to services in cloud-based multi-tenant systems as recited in claim 8, wherein the plurality of policies and the plurality of tokens operate at an application layer.

15. A policy-controlled token authorization system for managing secure access to services in cloud-based multi-tenant systems using access tokens, the policy-controlled token authorization system comprising a plurality of servers, collectively having code for:
   requesting by a local application running on a client device access to a service on a remote application running on a remote instance of a web server, wherein a token is required to access the service;
   correlating the token with a plurality of tokens in a token repository for identifying a policy from a plurality of policies associated with the token, wherein:
   the plurality of policies specify access to a plurality of remote applications to be used at the client device for accessing a plurality of services using the plurality of tokens, and
   the plurality of tokens is categorized in the token repository based on the plurality of policies;

determining an authorization by a mid-link server corresponding to the token for accessing the service based on the correlation; and in response to determining the authorization, either:

authorizing the token for accessing the service via the remote application, or blocking the token when unauthorized to prevent access to the service, wherein the policy associated with the token is modified based on re-authorization of the token by an administrator, and a threat level associated with the token and the remote application, the threat level is determined based on a usage history of the token, and the usage history of the token includes:

administrator reports including information from the administrator on blocked tokens, re-authorized tokens and unidentified tokens, and user reports including information on the tokens from the client device.

16. The policy-controlled token authorization system for managing secure access to services in cloud-based multi-tenant systems using access tokens as recited in claim 15, further comprising transmitting a request to an administrator for an inspection, wherein the policy associated with the token is modified based on the inspection, and the token is reauthorized based on the modified policy.

17. The policy-controlled token authorization system for managing secure access to services in cloud-based multi-tenant systems using access tokens as recited in claim 15, wherein a confidence score is generated by the mid-link server for the token, and the confidence score is based on the threat level associated with the token.

18. The policy-controlled token authorization system for managing secure access to services in cloud-based multi-tenant systems using access tokens as recited in claim 15, wherein the plurality of policies is set based on user logs, a tenant of the client device, confidentiality associated with the service or the plurality of remote applications, a type of the client device, and/or a user designation associated with the client device.

19. The policy-controlled token authorization system for managing secure access to services in cloud-based multi-tenant systems using access tokens as recited in claim 15, wherein a time duration for use of the token to access the service is restricted by an administrator.

20. The policy-controlled token authorization system for managing secure access to services in cloud-based multi-tenant systems using access tokens as recited in claim 15, wherein the plurality of policies and the plurality of tokens operate at an application layer.

* * * * *